US008406964B2

(12) United States Patent
Baumgarten et al.

(10) Patent No.: US 8,406,964 B2
(45) Date of Patent: Mar. 26, 2013

(54) DRIVER ASSISTANCE SYSTEM FOR AGRICULTURAL WORKING MACHINES

(75) Inventors: Joachim Baumgarten, Beelen (DE); Werner Fitzner, Warendorf (DE); Sebastian Neu, Bad Laer (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 312 days.

(21) Appl. No.: 12/683,480

(22) Filed: Jan. 7, 2010

(65) Prior Publication Data
US 2010/0217474 A1 Aug. 26, 2010

(30) Foreign Application Priority Data

Feb. 20, 2009 (DE) .......................... 10 2009 009 767

(51) Int. Cl.
*G06F 7/70* (2006.01)
(52) U.S. Cl. .................... 701/50; 701/1; 700/83; 700/89
(58) Field of Classification Search ................ 701/1, 50; 700/83, 89
See application file for complete search history.

(56) References Cited

U.S. PATENT DOCUMENTS

| 5,951,395 | A * | 9/1999 | Peter .............................. 460/119 |
| 6,726,559 | B2 * | 4/2004 | Bischoff ........................... 460/1 |
| 6,863,604 | B2 * | 3/2005 | Behnke ............................ 460/6 |
| 7,415,340 | B2 * | 8/2008 | Fitzner ............................. 701/50 |
| 2003/0066277 | A1 * | 4/2003 | Behnke ...................... 56/10.2 R |
| 2005/0004737 | A1 * | 1/2005 | Fitzner ............................. 701/50 |
| 2005/0137003 | A1 * | 6/2005 | Behnke et al. .................... 460/1 |

FOREIGN PATENT DOCUMENTS

DE 101 47 733 4/2003

* cited by examiner

*Primary Examiner* — James Trammell
*Assistant Examiner* — Truc M Do
(74) *Attorney, Agent, or Firm* — Michael J. Striker

(57) ABSTRACT

A driver assistance system for an agricultural working machine, in particular a combine harvester has a large number of working mechanisms, an arithmetic logic unit, and at least one display unit, in which the arithmetic logic unit may process information generated by machine-internal sensor systems, external information, and information that is storable in the arithmetic logic unit, and in which the driver assistance system overcomes—with consideration for at least a selection of the available information—critical functions of the agricultural working machine in that efficiency parameters of the agricultural working machine are optimized via interactive, natural-language communication between the operator of the agricultural working machine and the driver assistance system.

36 Claims, 10 Drawing Sheets

DRIVER ASSISTANCE SYSTEM FOR AGRICULTURAL WORKING MACHINES

CROSS-REFERENCE TO A RELATED APPLICATION

The invention described and claimed hereinbelow is also described in German Patent Application DE 10 2009 009 767.8 filed on Feb. 20, 2009. This German Patent Application, whose subject matter is incorporated here by reference, provides the basis for a claim of priority of invention under 35 U.S.C. 119(a)-(d).

BACKGROUND OF THE INVENTION

The present invention relates to a driver assistance system for agricultural working machines.

DE 101 47 733 made known a driver assistance system that supports the operator of an agricultural working machine in the optimization of the working parameters of the working mechanisms. The driver assistance system includes a complex display unit as well as an arithmetic logic unit for processing various sensor signals. The agricultural working machine, which is designed as a combine harvester, includes a large number of working mechanisms, e.g., a header, a threshing mechanism, separating mechanisms, and at least one cleaning mechanism, which are coupled to a large number of sensing mechanisms capable of detecting working parameters of the working mechanisms as well as efficiency parameters of the agricultural working machine, such as grain loss, grain quality, and tailings quantity.

The information that is ascertainable using the sensing mechanisms is forwarded to the central arithmetic logic unit which derives information from these signals that may be visualized in the display device. The visualized information includes working parameters of the agricultural working machine, such as cylinder speed, cleaning fan speed, crop material throughput, and concave width, as well as efficiency parameters such as the grain loss from the cleaning and separating mechanisms. To optimize the various working parameters, a method is provided in DE 101 47 733, in which, in a first method step, the operator guides the agricultural working machine through the stand to be harvested at a ground speed that is appropriate for the expected crop material throughput, thereby ensuring that the combine harvester is acted upon by an approximately consistent quantity of crop material within a certain time period. The operator must wait until the combine harvester has reached a state of equilibrium in which an approximately consistent, good or bad working result is attained. This working result is recorded, and it is visualized to the operator in the display unit. If the working result is unsatisfactory, the operator of the combine harvester makes repeated changes to a promising working parameter of a working mechanism, and, each time, waits for the combine harvester to reach a state of equilibrium using the modified working parameter. All of the working results are recorded as a function of time, thereby enabling the operator to identify the specific value of the working parameter at which the best working result was attained. This specific value is then used to adjust the particular working mechanism, thereby ensuring that an improved working result of the agricultural working machine is ultimately attained.

A method of this type has the main disadvantage that a relatively long period of time is required before the various working parameters of the combine harvester function within an optimized parameter range, since the disclosed adjustment procedure must be implemented for every working parameter. In addition, in the case of an adjustment method structured in this manner, performing optimization rapidly and successfully is decisively dependent on the level of knowledge of the operator of the agricultural working machine, since the various working parameters influence one another via highly complex interactions.

SUMMARY OF THE INVENTION

The object of the present invention, therefore, is to avoid the disadvantages of the related art described above and, in particular, to provide a driver assistance system for optimizing the efficiency of an agricultural working machine which ensures that the agricultural working machine reaches an optimized operating state within the shortest amount of time possible without telling the operator what to do.

In keeping with these objects and with others which will become apparent hereinafter, one feature of the present invention resides, briefly stated in a driver assistance system for an agricultural working machine, in particular a combine harvester, comprising a large number of working mechanisms, an arithmetic logic unit, and at least one display unit, in which the arithmetic logic unit may process information generated by machine-internal sensor systems, external information, and information that is storable in the arithmetic logic unit, wherein the driver assistance system overcomes—with consideration for at least a selection of the available information—critical functions of the agricultural working machine in that efficiency parameters of the agricultural working machine are optimized using interactive, natural-language communication between the operator of the agricultural working machine and the driver assistance system.

Another feature of the present invention resides, briefly stated in a method for assisting a driver with a driver assistance system for an agricultural working machine, in particular a combine harvester, comprising a large number of working mechanisms, an arithmetic logic unit, and at least one display unit, in which the arithmetic logic unit may process information generated by machine-internal sensor systems, external information, and information that is storable in the arithmetic logic unit, wherein the driver assistance system overcomes—with consideration for at least a selection of the available information—critical functions of the agricultural working machine in that efficiency parameters of the agricultural working machine are optimized using interactive, natural-language communication between the operator of the agricultural working machine and the driver assistance system.

Given that the driver assistance system overcomes—with consideration for at least a selection of the available information—critical functions of an agricultural working machine in that efficiency parameters of an agricultural working machine are optimized via interactive, natural-language communication between the operator of the agricultural working machine and the driver assistance system, it is ensured that an optimized working state of the agricultural working machine is attained in the shortest amount of time possible without the driver assistance system telling the operator what to do during the optimization process.

A particularly efficient use of the driver assistance system results when the operator of the agricultural working machine identifies the critical function and activates the driver assistance system, or when the driver assistance system is automatically activated when a critical function has been identified. It is ensured via a structure of this type that the operator of the agricultural working machine is prompted to deal with an optimization of a working parameter only if the working result worsens to a significant extent.

To ensure that the operator may reliably follow the course of the optimization over time, remain informed about the effect achieved, and remain adequately informed at all times about the handling steps being carried out and to be carried out, the driver assistance system preferably operates using the following steps:

a.) Analyze the function of the agricultural working machine and identify a critical function, b.) Work through a tactical solution path—which is stored in the arithmetic logic unit—for overcoming the critical function of the agricultural working machine in a manner such that optimized working parameters of one or more working mechanisms are suggested, c.) Adjust—either automatically or via input from the operator—the optimized working parameters generated in step b.) on one or more working mechanisms of the agricultural working machine, and operate the agricultural working machine using the optimized working parameters, and d.) Evaluate and check the function of the agricultural working machine after the optimized working parameters have been adjusted on the at least one working mechanism.

In an advantageous embodiment of the present invention, after step d.) has been carried out, the driver assistance system may also evaluate and check contrary efficiency parameters and/or quality criteria, in a step e.). This has the advantage that the interactions between the various efficiency parameters, quality criteria, and working parameters are monitored, and negative influences of optimized parameters on contrary efficiency parameters and/or quality criteria are detected, thereby ensuring that the function of the agricultural working machine is always taken into account as a whole.

In a further advantageous embodiment of the present invention, the operator of the agricultural working machine may initiate the reset of the optimized working parameter when one or more contrary efficiency parameters and/or quality criteria are outside of the permissible value ranges, thereby preventing a negative effect on the overall function of the agricultural working machine.

The driver assistance system according to the present invention may be used in a highly flexible manner when, in step a.), at the least, working parameters of the working mechanisms of the agricultural working machine and/or efficiency parameters of the agricultural working machine are monitored, and a critical function is identified when at least one working parameter and/or at least one efficiency parameter deviates from expected value ranges stored in the arithmetic logic unit, or when the operator evaluates an efficiency parameter as being unsatisfactory.

It is ensured that a parameter is optimized in a manner that is strictly determined by the operator when, in particular, the operator enters into intensive interaction with the driver assistance system according to the present invention, and all essential parameter changes must be actively confirmed by the operator.

This ensures that the operator is not told what to do by the driver assistance system while the function of his machine is being optimized, which ultimately also increases the acceptance of the parameter optimization that was carried out. With this in mind, the operator of the agricultural working machine is prompted, in a first menu step, to select the efficiency parameter to be optimized, and, in a subsequent menu step, he is prompted to select the quality criterium—to be improved—of the efficiency parameter selected in the first menu step.

The principle of operator-directed optimization is likewise taken into account in an advantageous embodiment in that the driver assistance system suggests an optimized working parameter for at least one working mechanism depending on the efficiency parameters defined by the operator of the agricultural working machine, and on associated quality criteria, and in that the operator of the agricultural working machine initiates the adjustment of the optimized working parameter on the at least one working mechanism by accepting or rejecting the suggestion.

To ensure that the optimization result may be correctly evaluated, and that the operator is kept adequately informed at all times about the resultant change to the working result, it is provided according to an advantageous embodiment of the present invention that, after the adjustment of the optimized working parameter on the at least one working mechanism has been confirmed, the agricultural working machine runs through a brief adjustment phase, and the change to one or more efficiency parameters and/or quality criteria is visualized in the display unit in relation to the value of these efficiency parameters and/or quality criteria before the working parameters were changed.

A high-quality optimization result is likewise attained in that the visualized efficiency parameters are linked in the arithmetic logic unit to the harvesting conditions via functional dependencies, thereby ensuring that harvesting conditions that change during the adjustment phase are taken into account in the visualization of the efficiency parameters.

Given that the operator of the agricultural working machine is prompted, in the subsequent menu step, to evaluate the quality of the change made to the quality criterium and/or efficiency parameter, and/or given that the driver assistance system performs the evaluation automatically and visualizes it in the display unit, it is ensured that the operator may incorporate his own knowledge and observations in the optimization process. This also increases the operator's acceptance of an optimization system of this type.

It is possible to evaluate the optimization result rapidly and in a manner that is easily processed electronically when the evaluation is limited to the qualitative properties "better", "worse", or "same".

A driver assistance system that functions in a highly efficient manner is attained when, if the suggested solution is rejected, or if the quality is evaluated as being "worse" or "same", the driver assistance system suggests that an alternative working parameter be optimized. Given that the suggestion is based on the analysis of expert knowledge stored in the arithmetic logic unit, in which case the expert knowledge accounts for the interrelationships between various efficiency parameters, quality criteria, and working parameters of the working mechanisms, it is possible to attain a satisfactory optimization result within an extremely short period of time. In addition, it is not necessary for the operator to have detailed expert knowledge of these highly complex interrelationships.

In an advantageous embodiment of the present invention, the operator of the agricultural working machine is prompted, in the subsequent menu step, to accept or reject the optimization of the alternative working parameter, in which case the operator of the agricultural working machine brings about the optimization of the alternative working parameter via his choice to accept or reject. In an analogous manner, this has the advantage that the operator remains in control of the optimization process.

Optimizing one working parameter often causes other efficiency parameters and/or quality criteria to worsen, and so it is provided in an advantageous embodiment of the present invention that the suggestion to accept an optimized working parameter may be linked to a mention of the effect this will have on one or more of the further efficiency parameters and/or quality criteria. In this manner, before the operator makes his decision, he receives a warning message stating the negative consequences that could arise if he accepts the suggestion, thereby enabling him to make a more qualified decision.

To ensure that the operator remains reliably informed about the success of the optimization even after the optimization has been carried out, it is furthermore provided that the optimization result is visualized in the display unit, in a result menu step.

A driver assistance system that eliminates critical functions of an agricultural working machine in a particularly effective manner is created when the efficiency parameters that may be optimized are "material flow/work snapshot" and/or "grain loss" and/or "tailings" and/or "grain quality". In this context, the optimization effect is increased further when the quality criteria "damaged grain" and/or "disawning/husking" and/or "grain cleanliness" are assigned to the efficiency parameter "grain quality"

the quality criteria "quantity of tailings", and/or "quantity of grain in the tailings" are assigned to the efficiency parameter "tailings"

the quality criteria "grain loss due to front attachment" and/or "grain loss due to separation" and/or "grain loss due to cleaning" and/or "grain loss due to separation" are assigned to the efficiency parameter "grain loss"

the quality criteria "header" and/or "swathing" and/or "combine mounted straw chopper" and/or "chopped material spreader" and/or "feeder housing" and/or "threshing mechanism" and/or "separating device" are assigned to the efficiency parameter "material flow/work snapshot".

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
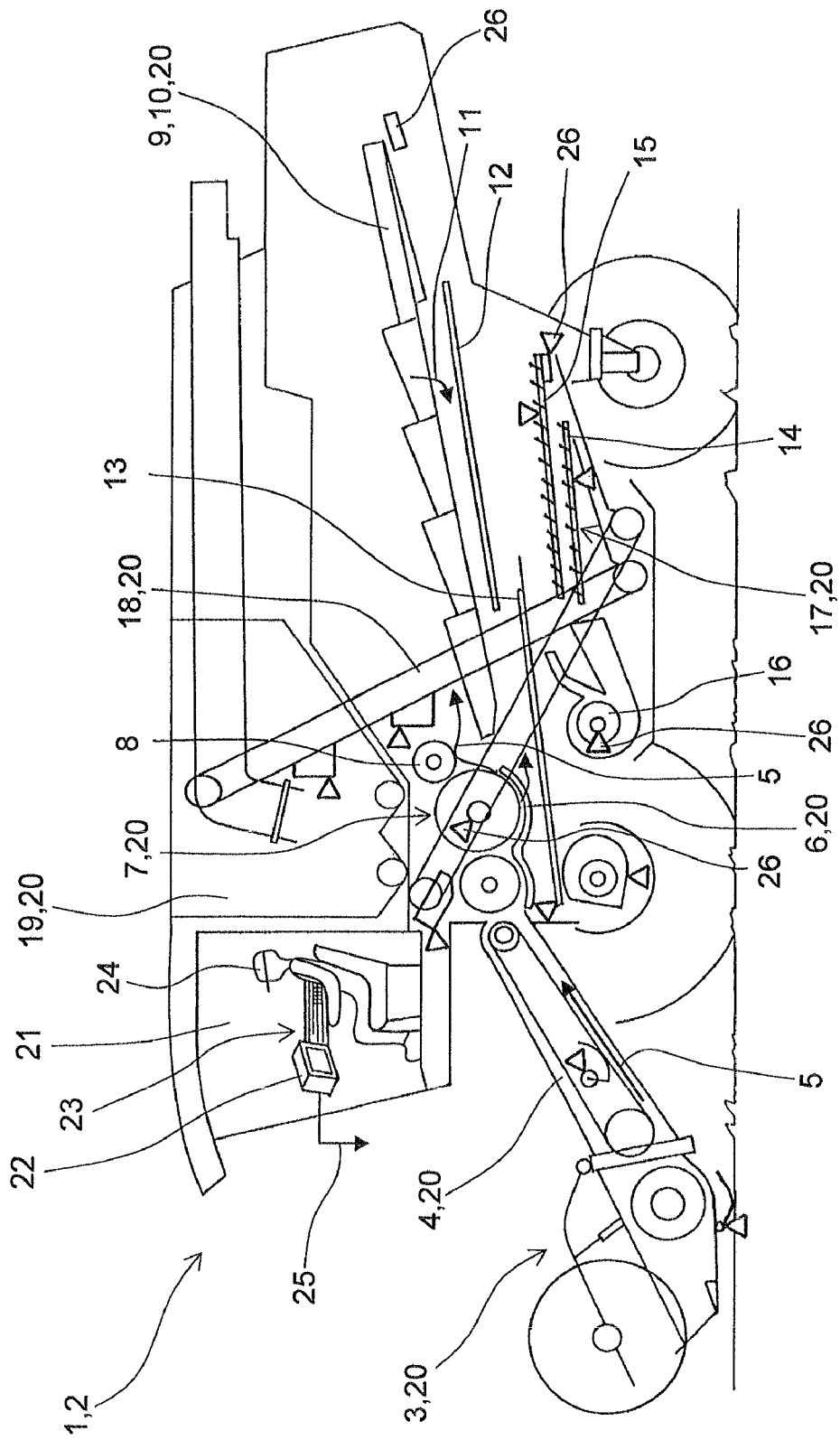
FIG. 1 shows an agricultural working machine designed as a combine harvester, which includes the driver assistance system according to the present invention.

Agricultural working machine 1, which is designed as a combine harvester 2 and is depicted schematically in FIG. 1, includes a grain-cutting device 3 in its front region, which is connected in a manner known per se to feed rake 4 of combine harvester 2. Crop material flow 5 that passes through feed rake 4 is transferred in upper, rear region of feed rake 4 to threshing parts 7 of combine harvester 2, which are at least partially enclosed on the bottom by concave 6. A guide drum 8 situated downstream of threshing parts 7 redirects material flow 5 in the rear region of threshing parts 7 after they exit threshing parts 7 in a manner such that it is transferred immediately to a separating device 10 designed as a tray-type shaker 9. Material flow 5 is conveyed on rotating tray-type shaker 9 in a manner such that any unencumbered grains 11 contained in the material flow are separated out in the region underneath tray-type shaker 9. Grains 11 that are separated out at concave 6 and on tray-type shaker 9 are directed via return pan 12 and feed pan 13 to a cleaning device 17 which is composed of several sieve levels 14, 15, and a fan 16. The cleaned flow of grain is then transferred via elevators 18 to a grain tank 19. Grain-cutting device 3, feed rake 4, threshing parts 7 and concave 6 assigned thereto, separating device 10, cleaning device 17, elevators 18, and grain tank 19 are referred to hereinbelow as working mechanisms 20 of agricultural working machine 1.

Agricultural working machine 1 also includes a driver's cab 21 in which at least one control/regulating device 23 which includes a display device 22 is located, using which a large number of processes to be described in greater detail may be controlled, the processes being initiated automatically or by operator 24 of agricultural working machine 1. Control/regulating device 23 communicates via a bus system 25 in a manner known per se with a large number of sensor systems 26. The structure of sensor systems 26 is described in detail in DE 101 47 733, the entire contents of which are hereby incorporated in the disclosure of this patent application, and so the structure of sensor systems 26 will not be described again hereinbelow.

Figure 2A:
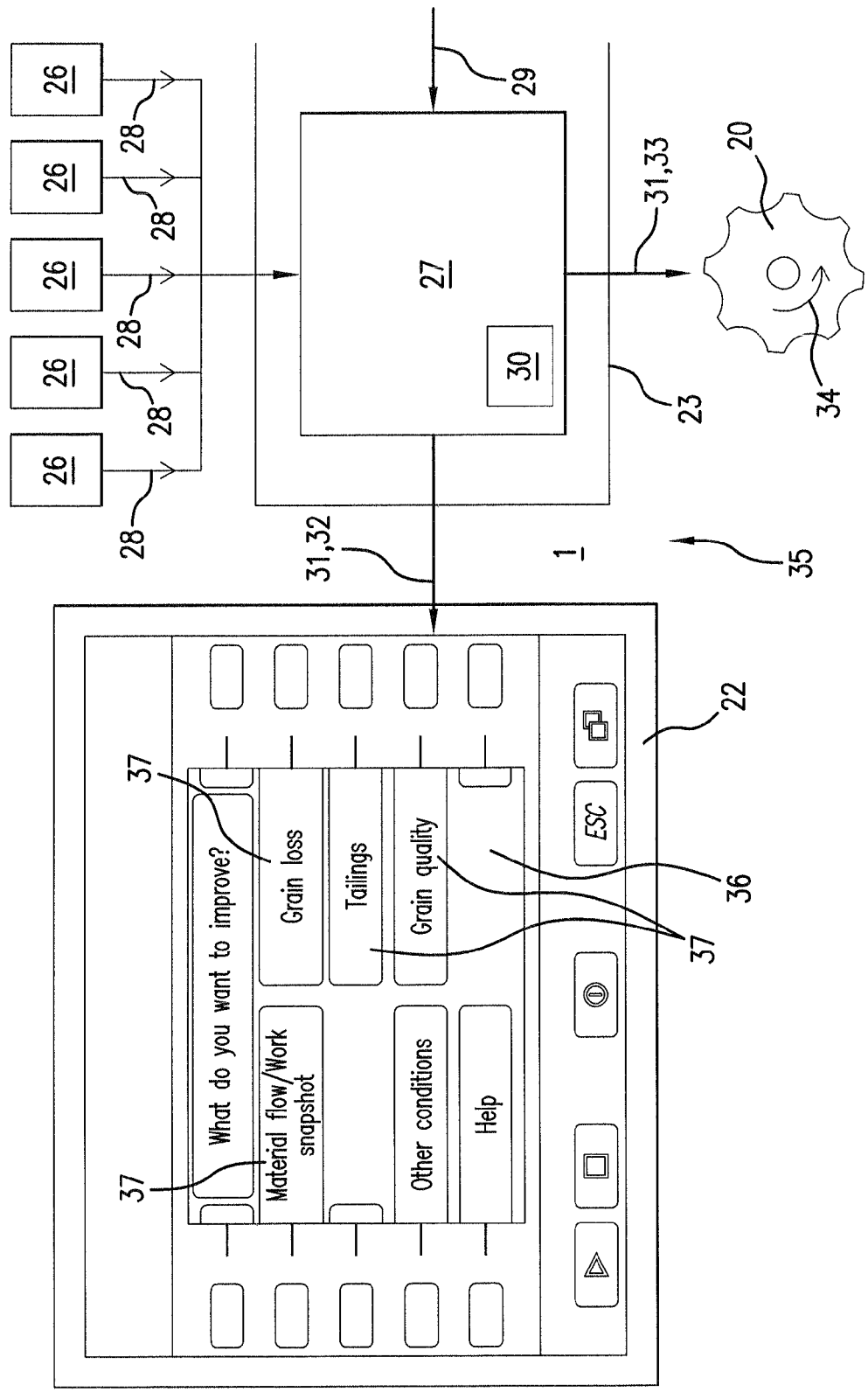
FIGS. 2a-e show the display layout of the driver assistance system according to the present invention.

FIG. 2a shows a schematic depiction of display unit 22 of control/regulating device 23, and arithmetic logic unit 27 which is assigned to control/regulating device 23 and is coupled to display unit 22. Arithmetic logic unit 27 is designed such that it may process information generated by sensor systems 26, as well as external information 29, and information 30 stored in arithmetic logic unit 27 itself, such as, e.g., expert knowledge, to obtain a large number of output signals 31. Output signals 31 are designed such that they include, at the least, display control signals 32 and working mechanism signals 33; the former determine the contents of display unit 22, and the latter initiate the changing of highly diverse working parameters 34 of working mechanisms of agricultural working machine 1. Arrow 34 symbolizes the cylinder speed. Control/regulating device 23, including display unit 22 and arithmetic logic unit 27 assigned to it, are components of driver assistance system 35 according to the present invention, display unit 22 of which enables interactive, natural-language communication to take place between operator 24 and driver assistance system 35 in a display area 36. Driver assistance system 35 is designed such that, with consideration for at least a selection of information 28-30 available in arithmetic logic unit 27, it may overcome or halt critical functions of agricultural working machine 1 by optimizing one or more efficiency parameters 37 of agricultural working machine 1 via this interactive, natural-language communication.

The aspects, according to the present invention, of this interactive, natural-language communication are described in greater detail below with reference to the flow charts shown in FIGS. 3a-d, and FIGS. 2a-d. Depending on whether agricultural working machine 1 according to FIG. 3a, reference numeral 38 includes suitable sensors 26 for detecting a critical function of agricultural working machine 1, operator 24 may identify the critical function and activate driver assistance system 35, field 39, or driver assistance system 35 is automatically activated when a critical function is identified, field 40. One or more working parameters 34 of working mechanisms 20 of agricultural working machine 1 and/or efficiency parameters 37 of agricultural working machine 1 are monitored while initial handling step 42 is being carried out. As shown in FIG. 2a, the embodiment shown includes efficiency parameters 37 "material flow/work snapshot", "grain loss", "tailings", and "grain quality". A critical function is identified, e.g., when at least one working parameter 34 and/or at least one of the efficiency parameters 37 deviates from the expected value ranges stored in arithmetic logic unit 27, or when operator 24 evaluates an efficiency parameter 37 as being unsatisfactory. Critical functions of a combine harvester 2 typically exist whenever the grain losses due to separation and cleaning are above an expected value range, the quantity of grain in the tailings and the volume of tailings deviate from the specified expected value ranges, the quantity of damaged grain is too high, or the cleanliness of the harvested grain is inadequate. The function of a combine harvester 2 may also be evaluated as being critical when the rotational speeds of working mechanisms 20 fall below limit values, the grain losses due to separation are much higher than the grain losses due to cleaning, or vice versa—which indicates that combine harvester 2 is being utilized inconsistently—or when the crop material throughput through combine harvester 2 is too low, e.g., combiner harvester 2 is being operated at a ground speed that is too slow, which may ultimately be identified by the permissible grain losses falling below the permissible level.

Figure 2B:
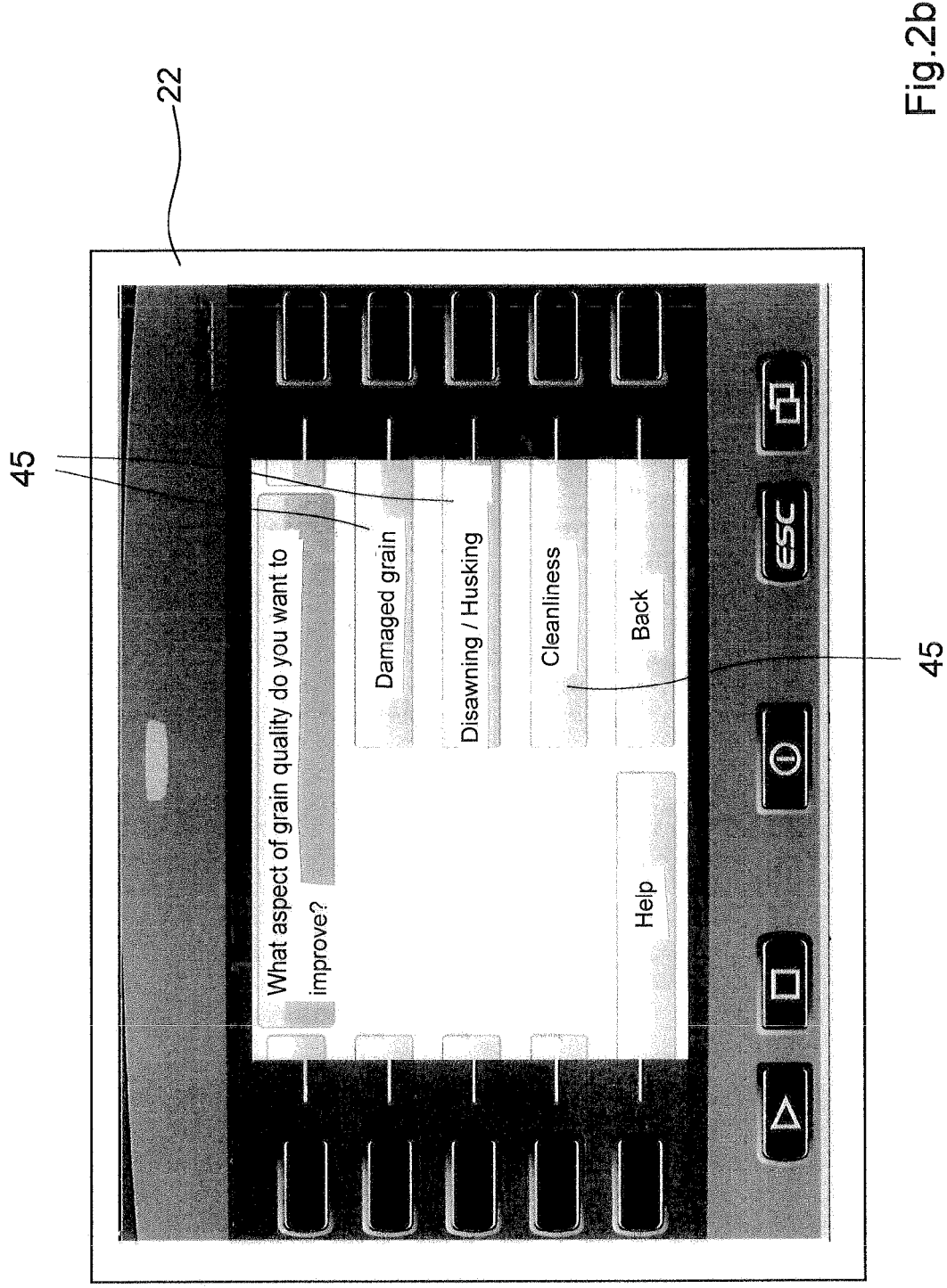
Figure 2C:
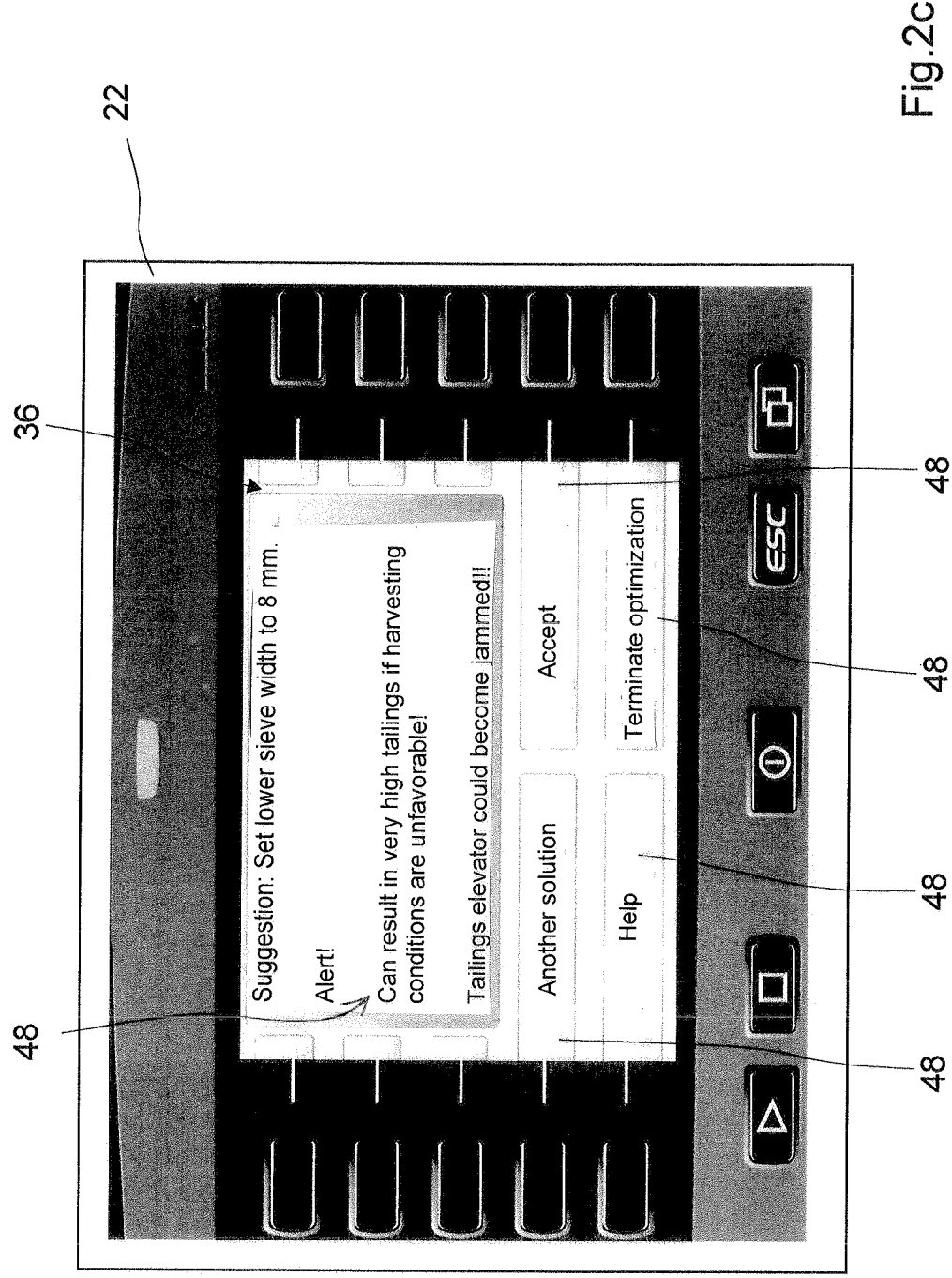

After the critical function has been identified and driver assistance system 35 has been started, in handling step 42, operator 24 is prompted, in a first menu step 43, to select efficiency parameter 37 to be optimized. This may take place, e.g., in the manner illustrated in FIG. 2a. If driver assistance system 35 directly proposes efficiency parameter 37 to be optimized, the actions to be performed by operator 24 may be limited to accepting or rejecting the suggestion. In subsequent menu step 44, operator 24 is prompted to select quality criterium 45—to be improved—of efficiency parameter 37 selected in first menu step 43; in the embodiment depicted in FIG. 2a, this is the efficiency parameter "grain quality". FIG. 2b shows, as an example, the structure of display unit 22 for menu step 44, in which quality criteria 45 "damaged grain" and/or "disawning/husking" and/or "grain cleanliness" are assigned to the efficiency parameter "grain quality". Display unit 22 has an analogous structure when one of the further efficiency parameters 37 is selected by operator 24 or suggested by driver assistance system 35. For example, the quality criteria "quantity of tailings" and/or "quantity of grain in the tailings" may be assigned to the efficiency parameter "tailings", the quality criteria "grain loss due to front attachment", and/or "grain loss due to separation" and/or "grain loss due to cleaning" and/or "grain loss due to separation" may be assigned to the efficiency parameter "grain loss", and the quality criteria "header" and/or "swathing" and/or "combine mounted straw chopper" and/or "chopped material spreader" and/or "feeder housing" and/or "threshing mechanism" and/or "separating device" may be assigned to the efficiency parameter "material flow/work snapshot".

As an option, it is possible to provide a further menu step 46 after quality criterium/criteria 45 is/are selected, in which driver assistance system 35 asks about harvesting situations that are not detectable using sensors, such as standing grain, down grain, or weeds, in which case operator 24 must enter this information. Once the various information has been entered, in a subsequent menu step 47, driver assistance system 35 uses a tactical solution path stored in arithmetic logic unit 27 to identify an optimized working parameter 34 of working mechanism 20 that is most likely to improve the function of agricultural working machine 1 if it is adjusted. In the embodiment shown, the quality criterium "cleanliness" was selected for the efficiency parameter "grain quality" to be optimized. In menu step 47, display unit 22 displays the structure shown in FIG. 2c, in which the optimized working parameter, which, in this case, is the suggestion to set the lower sieve width to 8 mm, is now displayed in display area 36 using natural language. In addition, display area 22 includes a notice field 48 which points out the effect that would result if a working parameter 34 would be changed, as recommended, to one or more of further efficiency parameters 37. In addition to the "lower sieve width" mentioned here, a large number of parameters may be considered to be optimizable working parameters 34 of combine harvester 2, such as the cylinder speed, cleaning fan speed, upper sieve width, concave width, ground speed, and/or the height of the front attachment above the ground. Furthermore, in menu step 47, display unit 22, which is preferably designed as a touchscreen, includes activation fields 48 which operator may touch to reject ("Another solution") or accept the suggestion, terminate the optimization process, or ask for help. If operator 24 accepts the suggestion, in decision step 49, then optimized working parameter 34 is adjusted on particular working mechanism 20 in a further menu step 50 either directly by driver assistance system 35, or operator 24 himself implements the change to related working parameter 34, in which case an adjustment mechanism is activated or the change is carried out using a tool. If operator 24 rejects the proposed solution in decision step 49, then driver assistance system 35 performs a check in intermediate step 49a to determine whether any further proposed solutions exist. If not, the optimization is halted, in an intermediate step 49b, or driver assistance system 35 makes a suggestion, in an intermediate step 49c, based on the tactical solution path stored in arithmetic logic unit 27, as to how to proceed in order to eliminate the critical function of combine harvester 2 that was identified. In this case, driver assistance system 35 suggests that an alternative working parameter 34 be optimized, in which case the optimization procedure is continued based on this new suggestion, in decision step 49. The implementation of menu steps 43 through 49 represents, in entirety, second handling step 55, in which optimized working parameters 34 of working mechanisms 20 of combine harvester 2 are identified and suggested with consideration for the tactical solution path stored in arithmetic logic unit 27.

Figure 2D:
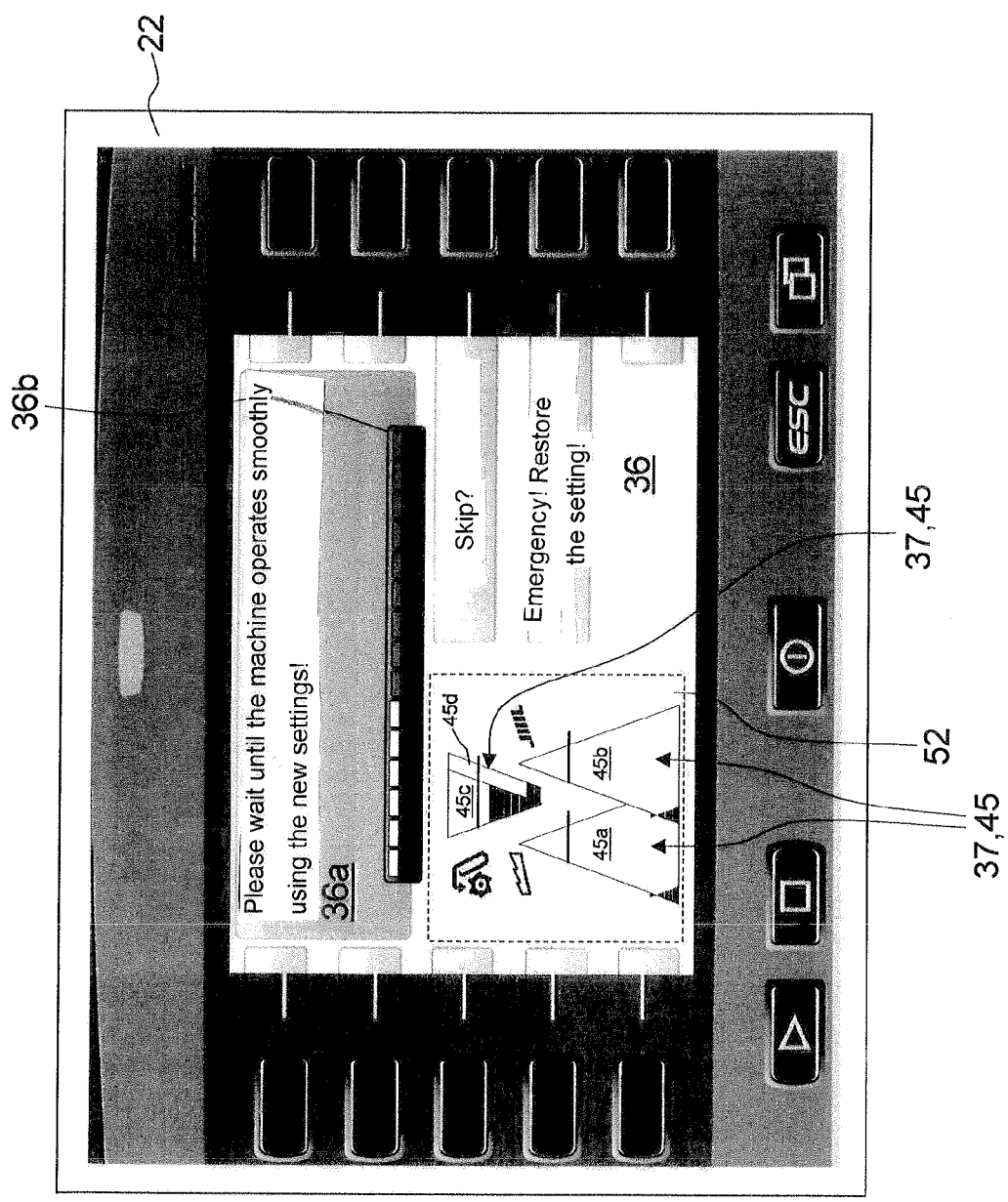

In subsequent, third, handling step 56, working parameters 34 that were identified are adjusted on combine harvester 2, and the combine harvester is operated using these working parameters. After optimized working parameter 37 is adjusted, the structure of display unit 22 shown in FIG. 2d is shown to operator 24 of combine harvester 2 in a subsequent menu step 51. In display area 36a, it is pointed out that agricultural working machine 1 has not yet reached a quasi-stationary phase, in which combine harvester 2 operates smoothly using modified working parameters 27. It lies within the scope of the present invention for a progress display 36b to be provided, thereby ensuring that operator 22 is informed about when the quasi-stationary state will be reached. Display area 36 now also includes a display area 52 for selected efficiency parameters 37 and/or quality criteria 45. In the embodiment shown, the quality criteria "grain loss due to separation" 45a, "grain loss due to cleaning" 45b, "quantity of tailings" 45c, and "quantity of grain in the tailings" 45d are visualized. In order to provide operator 24 with a quick overview of the change made to selected efficiency parameters 37 and/or quality criteria 45, they are presented in aforementioned display area 52 in such a manner that the visualization of the value of efficiency parameters 37 and/or quality criteria 45 that existed before particular working parameter 34 was changed is frozen in display area 52, thereby ensuring that operator 24 remains continually informed about their values. At the same time, the change made to visualized efficiency parameters 37 and/or quality criteria 45 is emphasized using color, in which case the color "red" represents a worsening, and the color "green" represents an improvement, thereby providing operator 24 with an immediate overview as to whether the critical function that was identified was eliminated entirely or partially or not at all. It lies within the scope of the present invention for visualized efficiency parameters 37 and/or quality criteria 45 to be linked in arithmetic logic unit 27 via functional dependencies to the harvesting conditions, thereby ensuring that harvesting conditions that change in the adjustment phase are taken into account in the visualization of efficiency parameters 37 and/or quality criteria 45.

Figure 2E:
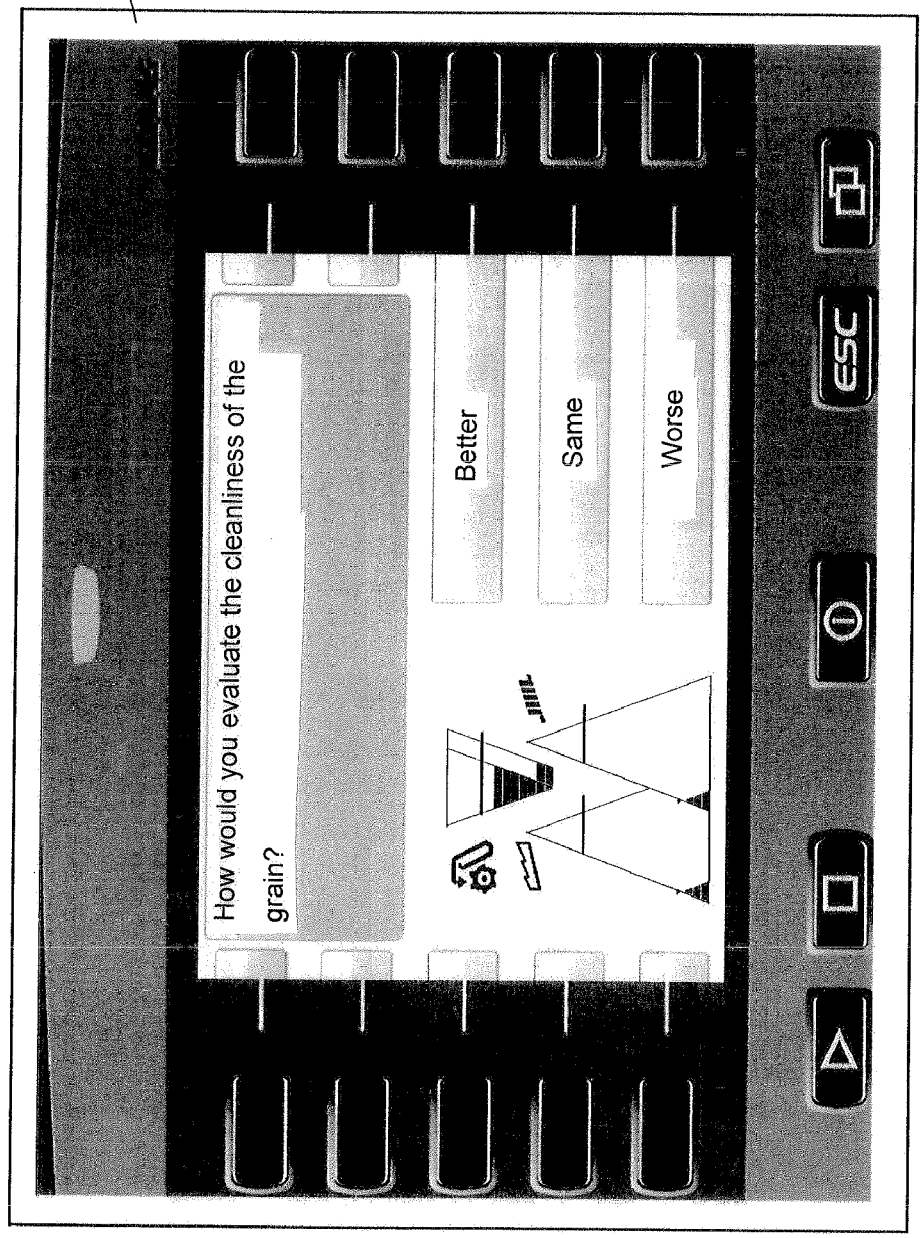

Depending on whether efficiency parameters 37 and/or quality criteria 45 to be improved are detectable using sensors, the improvement/worsening may be displayed in display device 22, in a further menu step 53. It is decisive that operator 24 is prompted, in subsequent menu step 54, to evaluate the quality of the optimization of efficiency parameters 37 and/or quality criteria 45, in which case operator 24 may evaluate the result of the optimization as "better", "worse", or "same", as shown in FIG. 2e. Menu steps 53 and 54 therefore likewise form fourth handling step 57 of driver assistance system 35, which involves the evaluation and checking of the function of agricultural working machine 1. If the operator evaluates the optimization result and, therefore, the function of agricultural working machine 1 as "same" or "worse", then driver assistance system 35 proceeds as shown in FIG. 3b, in which case path 2 represents the evaluation "same", and path 3 represents the evaluation "worse". If the evaluation is "same", operator 24 is asked, in menu step 58, whether the change made to working parameter 34 should be undone. If operator 24 rejects this, driver assistance system 35 transitions to a routine, which is described in greater detail below, to check contrary efficiency parameters 37 and/or quality criteria 45 (see path 1 and FIG. 3c).

If, after the optimization is implemented, the function is evaluated as being "worse", the driver assistance system automatically reverses the change made to working parameter(s) 34, in step 59. Depending on the type of agricultural working machine 1 involved, in subsequent working step 60, driver assistance system 35 initiates the reset of working parameter 34, or the operator must initiate the reset. If agricultural working machine 1 has finally reached the quasi-stationary phase once more (working step 61, FIG. 3b), the procedure advances to menu step 64 which is shown in FIG. 3c and will be explained in greater detail below. This transition is referred to as path 7 in FIGS. 3b and 3c, for clarity.

Figure 3A:
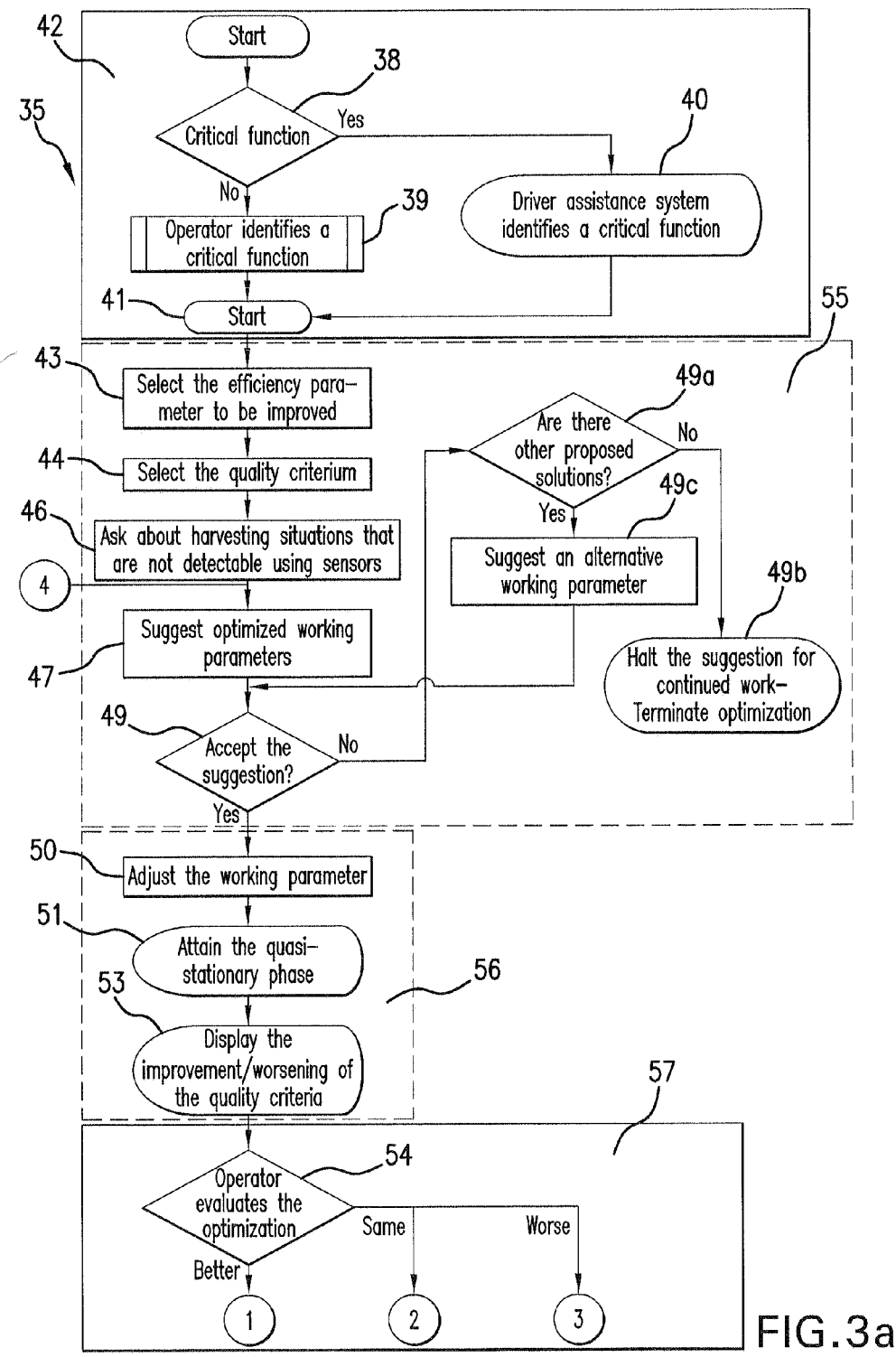
FIGS. 3a-d show a schematic flow chart of the driver assistance system according to the present invention.
Figure 3B:
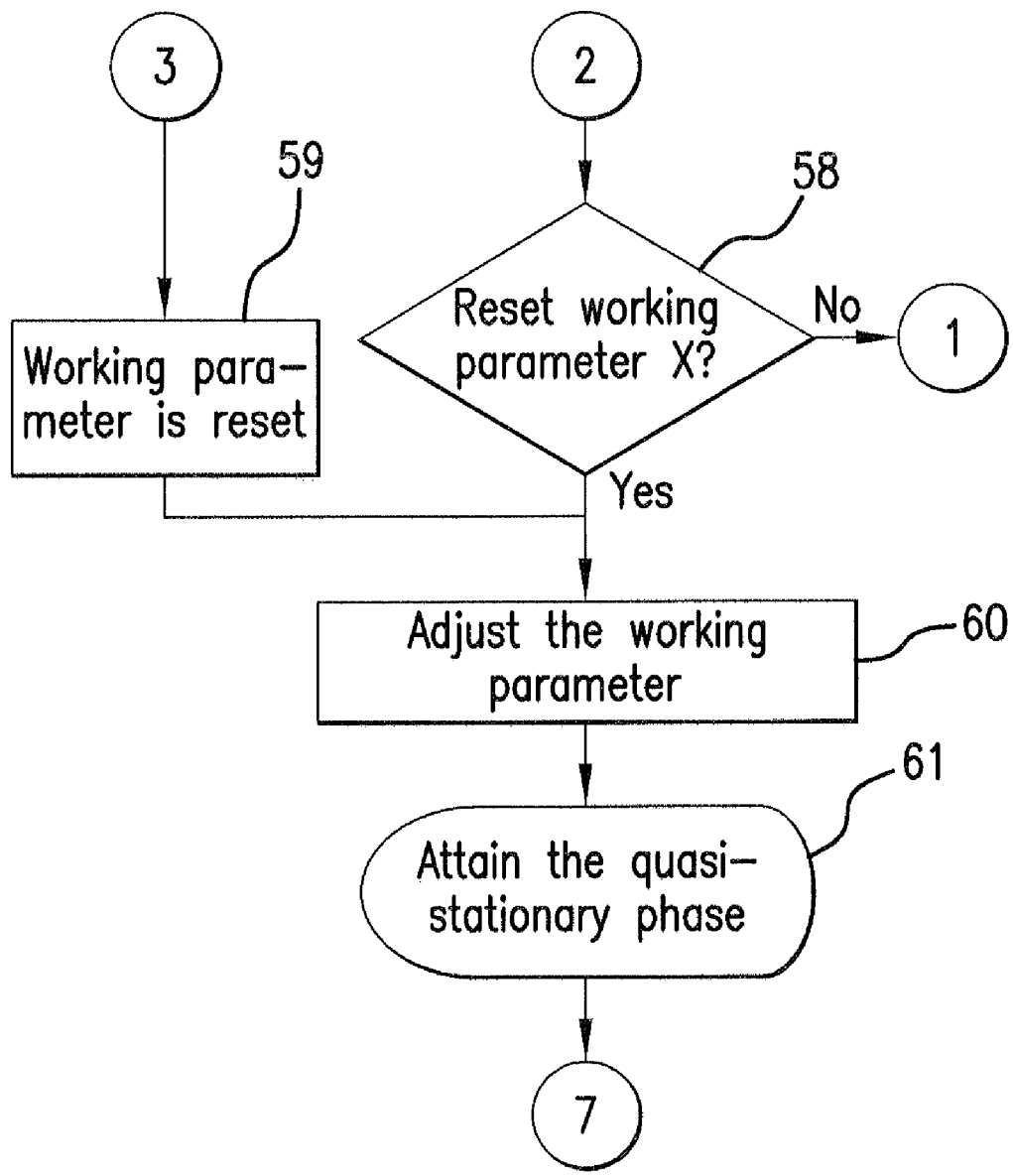
Figure 3C:
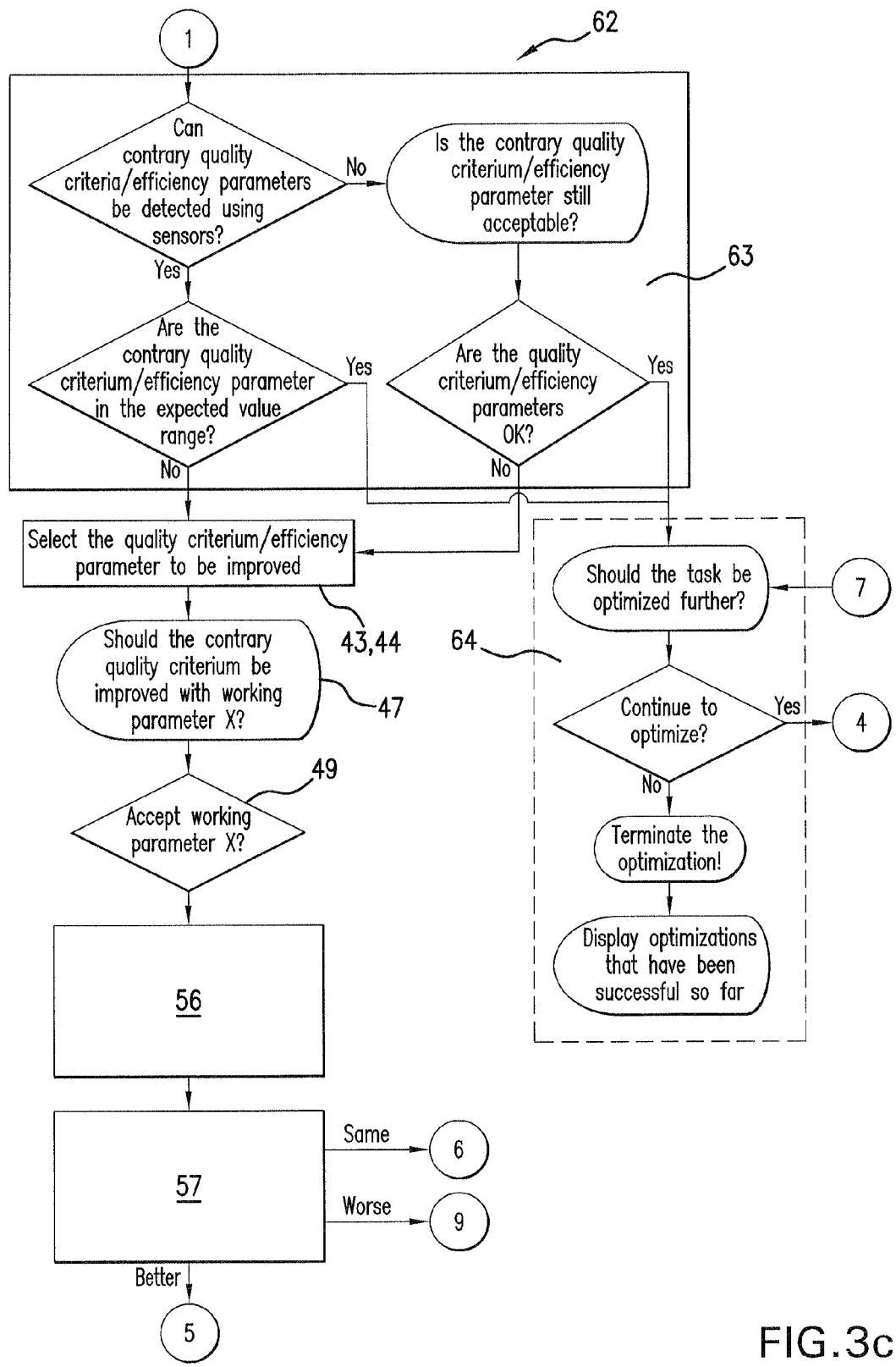

If operator 24 decides, in menu step 64, to continue the optimization, the optimization process restarts at menu step 47 shown in FIG. 3a (see path 4), i.e., the optimization of an alternative working parameter 34. As described above, the alternative proposal is based on a tactical solution path stored in arithmetic logic unit 27, the main component of which is the analysis of expert knowledge stored in arithmetic logic unit 27; the expert knowledge accounts for interrelationships between various efficiency parameters 37, quality criteria 45, and working parameters 34 of working mechanisms 20. Handling steps 55, 56 described above take place subsequently in the manner described above. Alternative working parameter 34 that was identified must likewise be accepted or rejected by operator 24, in which case the optimization of alternative working parameter 34 is brought about via the acceptance or rejection.

Due to the complex interrelationships between various efficiency parameters 37, quality criteria 45, and working parameters 34, driver assistance system 35 is designed such that it includes a submenu 62, as shown in FIG. 3c, for checking contrary efficiency parameters 37 and/or quality criteria 45. For example, the grain loss due to cleaning is a contrary quality criterium for increasing the rotational speed of cleaning fan 16 in order to improve the cleanliness of the grain, since an increase in the air flow through cleaning device 17 increases the risk that grains will be blown out of cleaning device 17, thereby resulting in a worsening of the efficiency parameter "grain loss". In an initial menu step 63, in analogy to first handling step 42 (FIG. 3a) described above, contrary efficiency parameters 37 and/or quality criteria 45 are checked by operator 24 or, if suitable sensors 26 are present for detecting contrary efficiency parameters 37 and/or quality criteria 45, by driver assistance system 35 itself. If no deviations are found to a contrary efficiency parameter 37 and/or quality criteria 45, then operator 24 may terminate or continue—by entering the appropriate selection—the optimization of working parameters 34 as indicated in menu step 64; if operator 24 chooses to continue, menu steps 43 through 54 are carried out once more (see path 4). However, if an impermissible deviation of contrary efficiency parameters 37 and/or quality criteria 45 from the stored expected value ranges is identified, then menu step 63 transitions, in an analogous manner, to menu steps 43, 44, 47, 49 of above-described, second working step 55, which are followed by likewise above-described, third and fourth working steps 56, 57, and so menu routine 62 likewise results in optimized working parameters 34 which overcome the critical functions of agricultural working machine 1 that were identified.

Figure 3D:
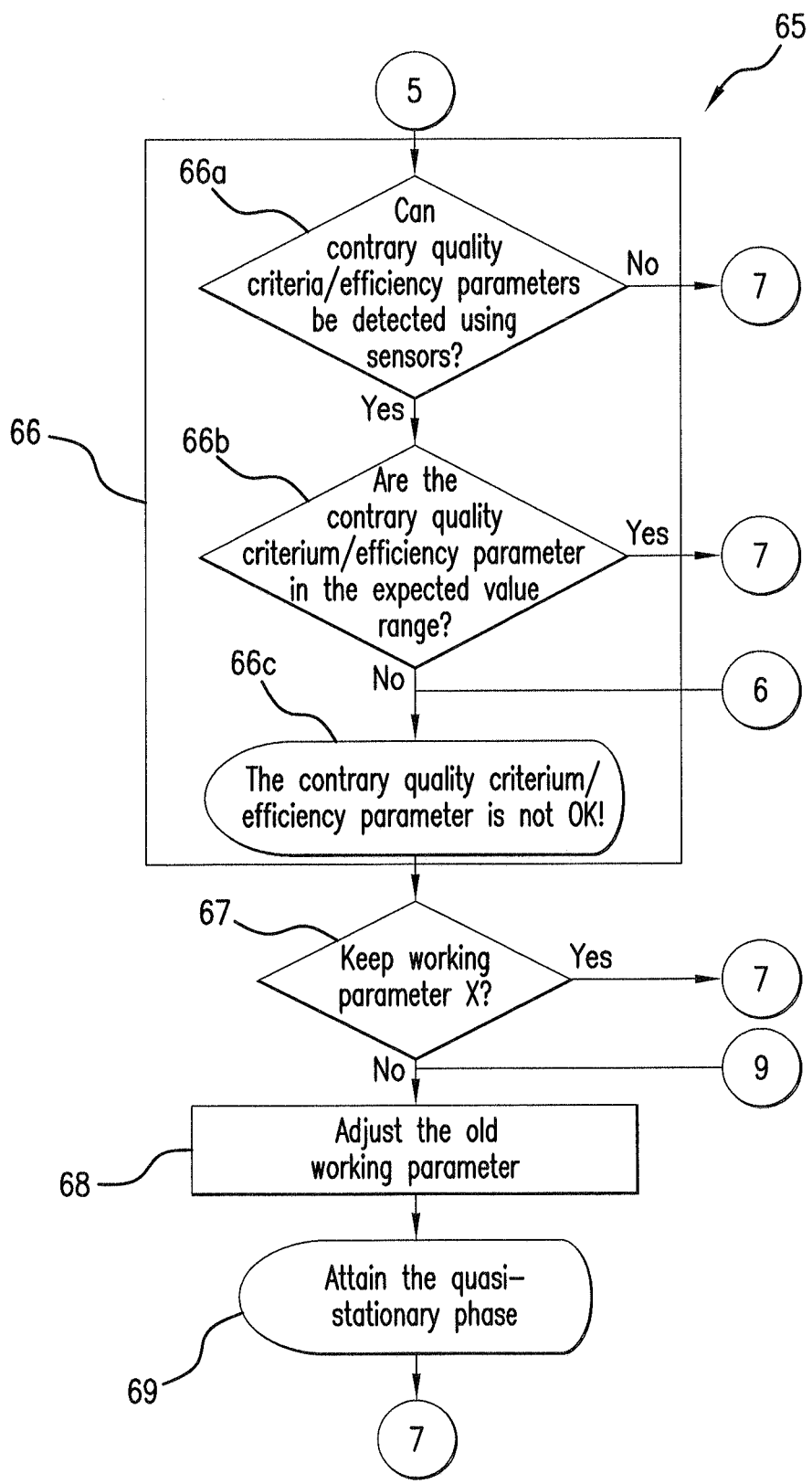

If the optimization of contrary efficiency parameter 37 and/or quality criterium 45 has resulted in an improvement of the function of agricultural working machine 1, but this improvement is not sufficient to move optimized efficiency parameters 37 and/or quality criteria 45 into the stored permissible ranges, then a further optimization routine 65 may follow submenu 62, as shown in FIG. 3d. This transition is described as path 5 in FIGS. 3c and 3d. In a query routine 66, the first step is to clarify whether contrary efficiency parameters 37 and/or quality criteria 45 are detectable using sensors (step 66a). If this is not possible, the procedure continues as indicated by path 7, to menu step 64 shown in FIG. 3c, namely the question as to whether optimization should continue. If sensor-based detection is possible, a question is posed in a further step 66b as to whether efficiency parameters 37 and/or quality criteria 45 are already located in their expected value ranges. If so, optimization continues as indicated by path 7, to menu step 64 shown in FIG. 3c, namely the question as to whether optimization should continue. If optimized efficiency parameters 37 and/or quality criteria 45 are not in the expected value range, this is communicated to operator 24 in a further step 66c. In a decision step 67, operator 24 must decide whether adjusted working parameter 34 should be retained or discarded. If working parameter 34 should be retained, then optimization continues as indicated by path 7, to menu step 64 shown in FIG. 3c, namely the question as to whether optimization should continue. If working parameter 34 should not be retained, it is reset in a further working step 68; the reset is initiated automatically by driver assistance system 35 or by operator 24. After working parameter 34 is reset, the attainment of the quasi-stationary phase of combine harvester 2 is visualized in a further menu step 69, in the manner described above, before driver assistance system 35 asks, in menu step 64, whether optimization should be continued, as indicated by path 7.

If only one equivalent optimization result is attained using submenu 62 depicted schematically in FIG. 3c, driver assistance system 65 immediately transitions to query routine 66 of further optimization menu 65, as indicated by path 6, in which case operator 24 must immediately accept or reject the working parameter that was identified. If the optimization result worsens after submenu 62 has been implemented, driver assistance system 35 immediately transitions to menu step 68 of further optimization routine 65, which is the reset of working parameter 34, as indicated by path 9.

It will be understood that each of the elements described above, or two or more together, may also find a useful application in other types of constructions and methods differing from the types described above.

While the invention has been illustrated and described as embodied in a driver assistance system for agricultural working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A driver assistance system for an agricultural working machine, in particular a combine harvester, comprising a large number of working mechanisms, an arithmetic logic unit, and at least one display unit, in which the arithmetic logic unit processes information generated by machine-internal sensor systems, external information, and information that is storable in the arithmetic logic unit,
    wherein the driver assistance system overcomes, with consideration for at least a selection of the available information, critical functions of the agricultural working machine in that efficiency parameters of the agricultural working machine are optimized using interactive, natural-language communication between an operator of the agricultural working machine and the driver assistance system; and
    wherein in response to prompting by the driver assistance system, the operator selects an efficiency parameter to be optimized and the driver assistance system suggests an optimized working parameter for a working mechanism depending on the efficiency parameter and the quality criteria associated with the selected efficiency parameter;
    wherein the operator initiates the adjustment of the optimized working parameter on the working mechanism by accepting or rejecting the suggestion;
    wherein if the suggested optimized working parameter is accepted, the agricultural working machine runs through a brief adjustment phase and the change to the efficiency parameter and/or quality criteria effected thereby is visualized in the display unit and the operator is prompted to evaluate the quality of the change of the efficiency parameter and/or the quality criterium through a visualization on the display unit of the natural language terms "better", "worse", or "same"; and
    wherein if the suggested solution or change to the working parameter is rejected, or if the quality is evaluated as being "worse" or "same", the driver assistance system suggests that an alternative working parameter to be optimized.

2. The driver assistance system as recited in claim 1, wherein the operator of the agricultural working machine identifies the critical operating state and activates the driver assistance system, or wherein the driver assistance system is automatically activated when a critical function has been identified.

3. The driver assistance system as recited in claim 1, wherein the processing of available information includes the steps
    a.) Analyze the function of the agricultural working machine and identify a critical function,
    b.) Work through a tactical solution path—which is stored in the arithmetic logic unit—for overcoming the critical function of the agricultural working machine in a manner such that optimized working parameters of one or more working mechanisms are suggested,
    c.) Adjust—either automatically via input from the operator—the optimized working parameters generated in step b.) on one or more working mechanisms of the agricultural working machine, and operate the agricultural working machine using the optimized working parameters, and
    d.) Evaluate and check the function of the agricultural working machine after the optimized working parameters have been adjusted on the at least one working mechanism.

4. The driver assistance system as recited in claim 3, wherein after step d.) has been carried out, contrary efficiency parameters and/or quality criteria are evaluated and checked in step e.).

5. The driver assistance system as recited in claim 4, wherein the operator of the agricultural working machine may initiate the reset of the optimized working parameter if one or more contrary efficiency parameters and/or quality criteria are outside of the permissible value ranges.

6. The driver assistance system as recited in claim 3, wherein in step a.), at least the working parameters of the working mechanisms of the agricultural working machine and/or efficiency parameters of the agricultural working machine are monitored, and a critical function is identified when at least one working parameter and/or at least one efficiency parameter deviates from expected value ranges stored in the arithmetic logic unit, or the operator evaluates an efficiency parameter as being unsatisfactory.

7. The driver assistance system as recited in claim 1, wherein the operator of the agricultural working machine is prompted, in a first menu step, to select the efficiency parameter to be optimized.

8. The driver assistance system as recited in claim 7, wherein the operator of the agricultural working machine is prompted, in the subsequent menu step, to select the quality criterium—to be improved—of the efficiency parameter selected in the first menu step.

9. The driver assistance system as recited in claim 1, wherein the visualized efficiency parameters and/or quality criteria are linked in the arithmetic logic unit to the harvesting conditions via functional dependencies, thereby ensuring that harvesting conditions that change during the adjustment phase are taken into account in the visualization of the efficiency parameters and/or quality criteria.

10. The driver assistance system as recited in claim 1, wherein the suggestion is based on the analysis of expert knowledge stored in the arithmetic logic unit, in which case the expert knowledge accounts for the interrelationships between various efficiency parameters, quality criteria, and working parameters of the working mechanisms.

11. The driver assistance system as recited in claim 10, wherein the operator of the agricultural working machine is prompted, in the subsequent menu step, to accept or reject the optimization of the alternative working parameter, and in which the operator of the agricultural working machine initiates the optimization of the alternative working parameter by accepting or rejecting the suggestion.

12. The driver assistance system as recited in claim 11, wherein the suggestion to accept an optimized working parameter may be linked to a mention of the effect this would have on one or more of the further efficiency parameters and/or quality criteria.

13. The driver assistance system as recited in claim 1, wherein in a result menu step, the optimization result is visualized in the display unit.

14. The driver assistance system as recited in claim 1, wherein the available efficiency parameters are "material flow/work snapshot" and/or "grain loss" and/or "tailings" and/or "grain quality".

15. The driver assistance system as recited in claim 14, wherein the quality criteria "damaged grain" and/or "disawning/husking" and/or "grain cleanliness" are assigned to the efficiency parameter "grain quality".

16. The driver assistance system as recited in claim 14, wherein the quality criteria "quantity of tailings" and/or "quantity of grain in the tailings" are assigned to the efficiency parameter "tailings".

17. The driver assistance system as recited in claim 14, wherein the quality criteria "grain loss due to front attachment" and/or "grain loss due to separation" and/or "grain loss due to cleaning" and/or "grain loss due to separation" are assigned to the efficiency parameter "grain loss".

18. The driver assistance system as recited in claim 14, wherein the quality criteria "header" and/or "swathing" and/or "combine mounted straw chopper" and/or "chopped material spreader" and/or "feeder housing" and/or "threshing mechanism" and/or "separating device" are assigned to the efficiency parameter "material flow/work snapshot".

19. A method for assisting a driver with a driver assistance system for an agricultural working machine, in particular a combine harvester, comprising the steps of
   providing a large number of working mechanisms, an arithmetic logic unit, and at least one display unit,
   processing by the arithmetic logic unit information generated by machine-internal sensor systems, external information, and information that is storable in the arithmetic logic unit, and
   overcoming by the driver assistance system, with consideration for at least a selection of the available information, critical functions of the agricultural working machine by optimizing efficiency parameters of the agricultural working machine using interactive, natural-language communication between an operator of the agricultural working machine and the driver assistance system;
   prompting the operator to select an efficiency parameter;
   suggesting by the driver assistance system an optimized working parameter for at least one working mechanism depending on efficiency parameter selected by the operator and on associated quality criteria;
   in response to accepting or rejecting the suggestion by the operator, initiating the adjustment of the optimized working parameter on the at least one working mechanism, running the agricultural working machine through a brief adjustment phase and visualizing the change to one or more efficiency parameters and/or quality criteria in the display unit in relation to the value of these efficiency parameters and/or quality criteria that existed before the working parameters were changed;
   prompting the operator to evaluate the quality of the change of the efficiency parameter and/or the quality criterium, and/or performing the evaluation automatically by the driver assistance system by visualizing the natural language term "better", "worse", or "same" in the display unit; and
   if the suggested solution is rejected, or if the quality is evaluated as being "worse" or "same", suggesting by the driver assistance system that an alternative working parameter be optimized.

20. The method for assisting a driver as recited in claim 19, further comprising identifying by the operator of the agricultural working machine the critical operating state and activating the driver assistance system, or activating the driver assistance system automatically when a critical function has been identified.

21. The method for assisting a driver as recited in claim 19, wherein the step of further of includes the steps
   a.) Analyzing the function of the agricultural working machine and identify a critical function,
   b.) Working through a tactical solution path—which is stored in the arithmetic logic unit—for overcoming the critical function of the agricultural working machine in a manner such that optimized working parameters of one or more working mechanisms are suggested,
   c.) Adjusting—either automatically via input from the operator—the optimized working parameters generated in step b.) on one or more working mechanisms of the agricultural working machine, and operate the agricultural working machine using the optimized working parameters, and
   d.) Evaluating and checking the function of the agricultural working machine after the optimized working parameters have been adjusted on the at least one working mechanism.

22. The method for assisting a driver as recited in claim 21, wherein after step d.) has been carried out, evaluating contrary efficiency parameters and/or quality criteria are evaluated and checking in step e.).

23. The method for assisting a driver as recited in claim 22, further comprising initiating by the operator of the agricultural working machine the reset of the optimized working parameter if one or more contrary efficiency parameters and/or quality criteria are outside of the permissible value ranges.

24. The method for assisting a driver as recited in claim 21, further comprising monitoring in step a.), at least the working parameters of the working mechanisms of the agricultural working machine and/or efficiency parameters of the agricultural working machine, and identifying a critical function when at least one working parameter and/or at least one efficiency parameter deviates from expected value ranges stored in the arithmetic logic unit, or the operator evaluates an efficiency parameter as being unsatisfactory.

25. The method for assisting a driver as recited in claim 19, further comprising prompting the operator of the agricultural working machine, in a first menu step, to select the efficiency parameter to be optimized.

26. The method for assisting a driver as recited in claim 25, further comprising prompting the operator of the agricultural working machine, in the subsequent menu step, to select the quality criterium—to be improved—of the efficiency parameter selected in the first menu step.

27. The method for assisting a driver as recited in claim 19, further comprising linking the visualized efficiency parameters and/or quality criteria in the arithmetic logic unit to the harvesting conditions via functional dependencies, thereby ensuring that harvesting conditions that change during the adjustment phase are taken into account in the visualization of the efficiency parameters and/or quality criteria.

28. The method for assisting a driver as recited in claim 19, further comprising basing the suggestion on the analysis of expert knowledge stored in the arithmetic logic unit, in which case the expert knowledge accounts for the interrelationships between various efficiency parameters, quality criteria, and working parameters of the working mechanisms.

29. The method for assisting a driver as recited in claim 28, further comprising prompting the operator of the agricultural working machine, in the subsequent menu step, to accept or reject the optimization of the alternative working parameter, and initiating by the operator of the agricultural working machine the optimization of the alternative working parameter by accepting or rejecting the suggestion.

30. The method for assisting a driver as recited in claim 29, further comprising linking the suggestion to accept an optimized working parameter to a mention of the effect this would have on one or more of the further efficiency parameters and/or quality criteria.

31. The method for assisting a driver as recited in claim 19, further comprising in a result menu step, visualizing the optimization result in the display unit.

32. The method for assisting a driver as recited in claim 19, further comprising using as the available efficiency parameters "material flow/work snapshot" and/or "grain loss" and/or "tailings" and/or "grain quality".

33. The method for assisting a driver as recited in claim 32, further comprising assigning the quality criteria "damaged grain" and/or "disawning/husking" and/or "grain cleanliness" to the efficiency parameter "grain quality".

34. The method for assisting a driver as recited in claim 32, further comprising assigning the quality criteria "quantity of tailings" and/or "quantity of grain in the tailings" are assigned to the efficiency parameter "tailings".

35. The method for assisting a driver as recited in claim 32, further comprising assignment the quality criteria "grain loss due to front attachment" and/or "grain loss due to separation" and/or "grain loss due to cleaning" and/or "grain loss due to separation" to the efficiency parameter "grain loss".

36. The method for assisting a driver as recited in claim 32, further comprising assigning the quality criteria "header" and/or "swathing" and/or "combine mounted straw chopper" and/or "chopped material spreader" and/or "feeder housing" and/or "threshing mechanism" and/or "separating device" to the efficiency parameter "material flow/work snapshot".

* * * * *